United States Patent
Ramsay (10) Patent No.: US 9,024,767 B2
(45) Date of Patent: May 5, 2015

(54) CONDITION MONITORING WITH ALARM CONFIDENCE LEVELS FOR FLOW METERING SYSTEMS

(71) Applicant: Daniel Measurement and Control, Inc., Houston, TX (US)

(72) Inventor: Lawson Hamilton Ramsay, Falkirk (GB)

(73) Assignee: Daniel Measurement and Control, Inc., Houston, TX (US)

( * ) Notice: Subject to any disclaimer, the term of this patent is extended or adjusted under 35 U.S.C. 154(b) by 205 days.

(21) Appl. No.: 13/928,711

(22) Filed: Jun. 27, 2013

(65) Prior Publication Data

US 2014/0111328 A1  Apr. 24, 2014

Related U.S. Application Data (60) Provisional application No. 61/716,151, filed on Oct. 19, 2012.

(51) Int. Cl.
*G08B 21/00* (2006.01)
*G08B 21/18* (2006.01)
*G01F 1/66* (2006.01)
*G01F 25/00* (2006.01)

(52) U.S. Cl.
CPC .............. *G08B 21/182* (2013.01); *G01F 1/662* (2013.01); *G01F 25/0007* (2013.01); *G01F 1/66* (2013.01)

(58) Field of Classification Search
CPC ............................ G08B 21/182; G08B 29/185
USPC ............. 340/506, 603, 606, 691.3; 73/158.18
See application file for complete search history.

(56) References Cited

U.S. PATENT DOCUMENTS 6,317,051 B1 * 11/2001 Cohen ........................... 340/603

\* cited by examiner

*Primary Examiner* — Jeffery Hofsass
(74) *Attorney, Agent, or Firm* — Conley Rose, P.C.

(57) ABSTRACT

Apparatus and method for monitoring flow meter operation. In one embodiment, a flow metering system includes a flow meter and a condition monitor. The flow meter is configured to measure volume of fluid flowing through the flow meter. The condition monitor is coupled to the flow meter and is configured to monitor a parameter of operation of the flow meter, and to compare a value of the parameter to a threshold. The condition monitor is also configured to generate an alarm based on the value exceeding the threshold, and to compute, based on the alarm, a confidence level indicating a degree of certainty that the system is operating in accordance with predetermined criteria.

21 Claims, 5 Drawing Sheets

| ALARM STATISTICS DURING DAY WHICH SAW A VELOCITY RANGE OF 6.2 TO 16.2 m/s WITHIN 1940 SECONDS   CONFIDENCE 53.4% | | | | | |
|---|---|---|---|---|---|
| ALARM | CURRENT STATE | TOTAL TIME ON DURING PERIOD | NUMBERS OF STATE CHANGES IN PERIOD | VELOCITY RANGE WHILE IN ALARM | RESULTING CONFIDENCE |
| ChordA SNR LOW | OFF | 94 | 2 | 15.6 TO 15.8 m/s | 95.1% |
| ChordA VOS OUT OF RANGE | OFF | 37 | 2 | 15.6 TO 15.8 m/s | 98.1% |
| ChordB GAIN OUT OF LIMITS | OFF | 903 | 19 | 15.4 TO 15.7 m/s | 53.4% |
| ChordB SNR LOW | OFF | 94 | 2 | 15.4 TO 15.7 m/s | 95.1% |
| VOS INTERCHORDAL SPAN ERROR | OFF | 90 | 2 | 15.4 TO 15.7 m/s | 95.4% |
| VOS vs AGA10 DEVIATION | OFF | 19 | 2 | 15.6 TO 15.7 m/s | 99.0% |
| VOS FOOTPRINT ERROR | OFF | 58 | 2 | 15.4 TO 15.7 m/s | 97.0% |
| ChordC VOS SPREAD OUT OF RANGE | OFF | 82 | 2 | 15.2 TO 15.4 m/s | 95.8% |
| <<END OF ALARM STATISTICS SUMMARY>> | | | | | |

CONDITION MONITORING WITH ALARM CONFIDENCE LEVELS FOR FLOW METERING SYSTEMS

CROSS-REFERENCE TO RELATED APPLICATION

The present application claims priority to U.S. Provisional Patent Application No. 61/716,151, filed on Oct. 19, 2012; which is hereby incorporated herein by reference in its entirety.

BACKGROUND

Natural gas is transported from place-to-place via pipelines. It is desirable to know with accuracy the amount of gas flowing in the pipeline, and particular accuracy is demanded when the fluid is changing hands, or "custody transfer." Even where custody transfer is not taking place, however, measurement accuracy is desirable, and in these situations, flow meters may be used.

Ultrasonic flow meters are one type of flow meter that may be used to measure the amount of fluid flowing in a pipeline. Ultrasonic flow meters have sufficient accuracy to be used in custody transfer. In an ultrasonic flow meter, acoustic signals are sent back and forth across the fluid stream to be measured. Based on parameters of received acoustic signals, the fluid flow velocity in the flow meter is determined. The volume of fluid flowing through the meter can be determined from determined flow velocities and the known cross-sectional area of the flow meter.

An ultrasonic flow metering system is subject to various conditions that affect the calibration, accuracy, and/or operation of the metering system. For example, accumulation of contaminants in the pipeline, flow restrictions, and/or differences or changes in operating environment with respect to calibration environment may affect flow meter accuracy. Accordingly, effective techniques for monitoring conditions related to flow meter operation and accuracy are desirable.

SUMMARY

Apparatus and method for monitoring flow meter operation are disclosed herein. In one embodiment, a flow metering system includes a flow meter and a condition monitor. The flow meter is configured to measure volume of fluid flowing through the flow meter. The condition monitor is coupled to the flow meter and is configured to monitor a parameter of operation of the flow meter, and to compare a value of the parameter to a threshold. The condition monitor is also configured to generate an alarm based on the value exceeding the threshold, and to compute, based on the alarm, a confidence level indicating a degree of certainty that the system is operating in accordance with predetermined criteria.

In another embodiment, a method for monitoring operation of a flow meter includes acquiring, by a monitoring system, a value of a parameter of operation of the flow meter during operation of the flow meter. The value of the parameter is compared to a threshold by the monitoring system. An alarm is generated, based on the value exceeding the threshold, by the monitoring system. A confidence level indicating a degree of certainty that the flow meter is operating in accordance with predetermined criteria is computed by the monitoring system.

In a further embodiment, a condition monitoring system for monitoring operation of a flow meter includes a parameter verification engine. The parameter verification engine is configured to acquire a value of a parameter of operation of the flow meter during operation of the flow meter, and to compare the value of the parameter to a threshold. The parameter verification engine is further configured to generate an alarm based on the value exceeding the threshold, and to compute, based on the alarm, a confidence level indicating a degree of certainty that the flow meter is operating in accordance with predetermined criteria.

BRIEF DESCRIPTION OF THE DRAWINGS

For a detailed description of exemplary embodiments of the invention, reference will now be made to the accompanying drawings in which.

NOTATION AND NOMENCLATURE

In the following discussion and in the claims, the terms "including" and "comprising" are used in an open-ended fashion, and thus should be interpreted to mean "including, but not limited to . . . . " In addition, the term "couple" or "couples" is intended to mean either an indirect or a direct electrical connection. Thus, if a first device couples to a second device, that connection may be through a direct electrical connection, or through an indirect electrical connection accomplished via other devices and connections. Further, the term "software" includes any executable code capable of running on a processor, regardless of the media used to store the software. Thus, code stored in memory (e.g., non-volatile memory), and sometimes referred to as "embedded firmware," " is included within the definition of software. The recitation "based on" is intended to mean "based at least in part on." Therefore, if X is based on Y, X may be based on Y and any number of other factors. The term "fluid" includes liquids and gases.

DETAILED DESCRIPTION

The following description is directed to various exemplary embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow.

Ultrasonic flow metering systems include condition monitors (e.g., condition-based monitoring systems) to enable detection of changes in metering system operation and/or system operating conditions, and correction of conditions causing the changes. An ultrasonic meter condition monitor is a system that monitors the operation of the ultrasonic meter and associated instrumentation. A condition monitor may analyze the operation of the metering system by performing exemplary functions such as:

detection of changes in flow characteristics such as flow profile, flow symmetry, flow swirl, flow turbulence, etc.

detection of changes in results of ultrasonic diagnostics such as error rate in the detection of ultrasonic signals, gain levels, noise levels, peakswitch detection, etc.

comparison of measured speed of sound from the ultrasonic flow meter to gas composition, pressure and temperature using the American Gas Association (AGA) 10 standard;

comparison of measured temperature against temperature derived from the speed of sound; and comparison of density derived from a gas composition sensor (e.g., a gas chromatograph) to density derived from speed of sound.

Conventional condition monitors evaluate various operational parameters of a metering system, such as predicted flow characteristics, and generate alarms indicating that a value of an operational parameter exceeds a threshold. Because the condition monitor may not be continually manned, the condition monitor may latch alarm values to allow subsequent review of alarm status. Evaluation of the conditions causing an alarm may be time consuming and/or require expert analysis not generally available at the site or the flow meter.

Diagnostics applied by a condition monitor are subject to a number of variables. Various flow and diagnostic principals used with ultrasonic meters are not applicable at low velocity, due to the increasing influences of the pipe wall (frictional and other boundary affects etc), general breakdown of the normal flow profile at low gas velocity, or other effects such as stratification. Some flow characteristics and diagnostic information may be related to velocity and therefore may change with velocity. Site installation effects such as geometry or pipework, manufacturing tolerances of the ultrasonic meter and its associated transducers etc., must be determined after a flow meter is put into operation and accounted for in establishing alarm thresholds.

Because no vendor specific or industry standards establish a point at which changes in ultrasonic diagnostic behavior trigger further investigation, conventional condition monitors provide no guidance with regard to whether an alarm merits further investigation. As a result, with conventional condition monitors, users lack justification for failing to analyze the conditions underlying an alarm.

Embodiments of the condition monitor disclosed herein compute a confidence level corresponding to each generated alarm. The confidence level indicates a degree of assurance or certainty that the metering system is operating properly with regard to the parameter(s) associated with the alarm. Proper operation may be defined as operation in accordance with predetermined criteria, such as manufacturer's operational specifications, standard's based operating limits, etc. Based on the confidence level, the condition monitor and/or an operator can determine whether an alarm condition merits further analysis. For example, a confidence level of proper operation at or greater than a predetermined value (e.g. 95%) with regard to an alarm may not merit further investigation.

Figure 1:
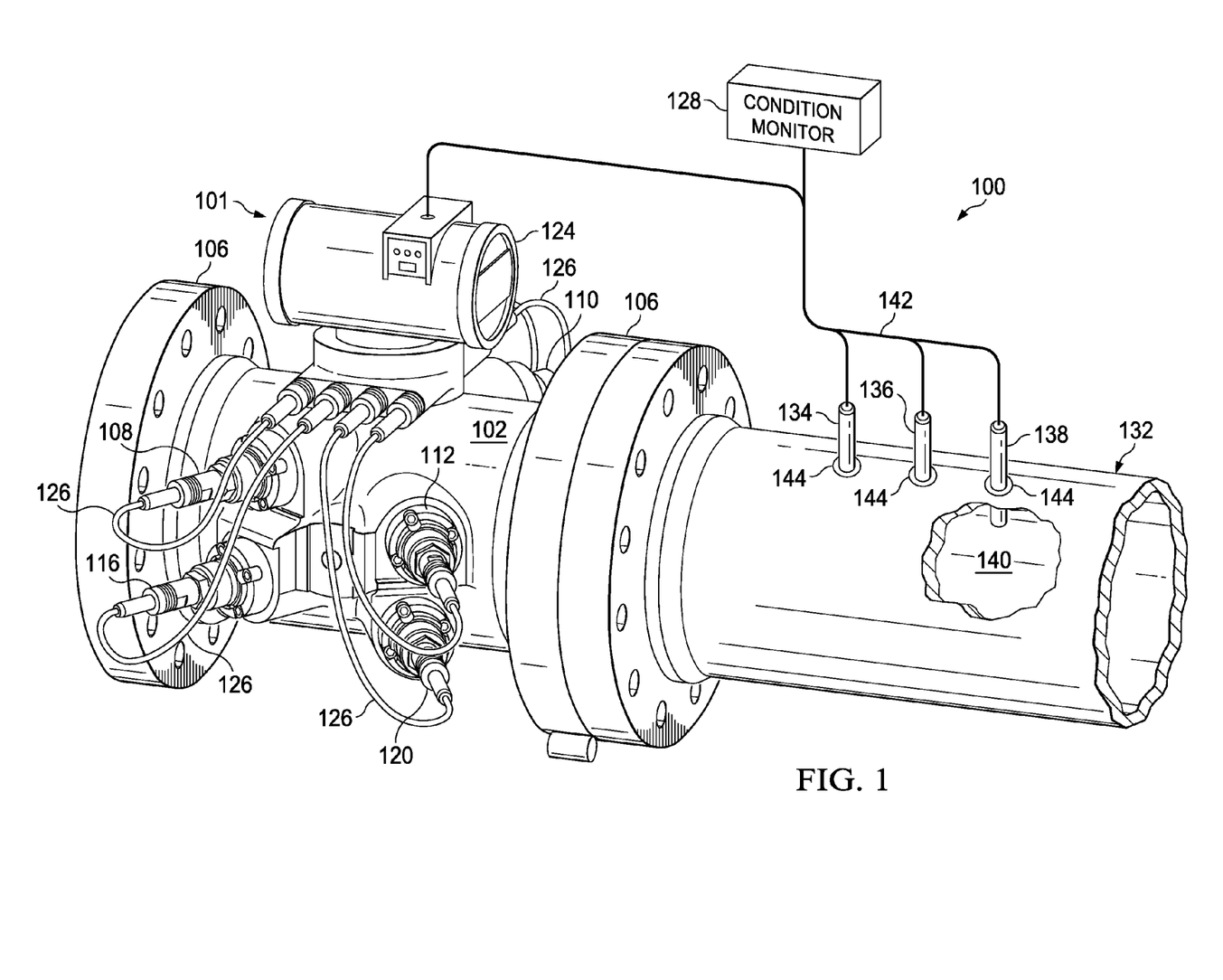
FIG. 1 shows an ultrasonic flow metering system in accordance with various embodiments.

FIG. 1 shows an ultrasonic flow metering system 100 in accordance with various embodiments. The system 100 includes an ultrasonic flow meter 101, sensors 134, 136 138, and a condition monitor 128. In the system 100, the ultrasonic flow meter 101 is coupled to a pipe or other structure 132. In some embodiments, the pipe 132 is disposed downstream of the ultrasonic flow meter 101. The pipe 132 includes openings 144 that allow sensors 134-138 to access the fluid stream flowing through the system 100. The condition monitor 128 is coupled to the sensors 134-138 and to the ultrasonic meter 101. In some embodiments, the condition monitor 128 may be part of a flow computer coupled to the ultrasonic meter 101. In other embodiments, the condition monitor 128 may be integrated with electronics 124 of the ultrasonic meter 101, or implemented as a discrete device.

The ultrasonic flow meter 101 includes a meter body or spool piece 102 that defines a central passage or bore. The spool piece 102 is designed and constructed to be coupled to a pipeline or other structure carrying fluids (e.g., natural gas) such that the fluids flowing in the pipeline travel through the central bore. While the fluids travel through the central bore, the ultrasonic flow meter 101 measures the flow rate (hence, the fluid may be referred to as the measured fluid). The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flow meter 101 includes a plurality of transducer assemblies. In the view of FIG. 1, five such transducers assemblies 108, 110, 112, 116 and 120 are in full or partial view. The transducer assemblies are paired (e.g., transducer assemblies 108 and 110), as will be further discussed below. Moreover, each transducer assembly electrically couples to control electronics package 124. More particularly, each transducer assembly is electrically coupled to the control electronics package 124 by way of a respective cable 126 or equivalent signal conducting assembly.

Figure 2:
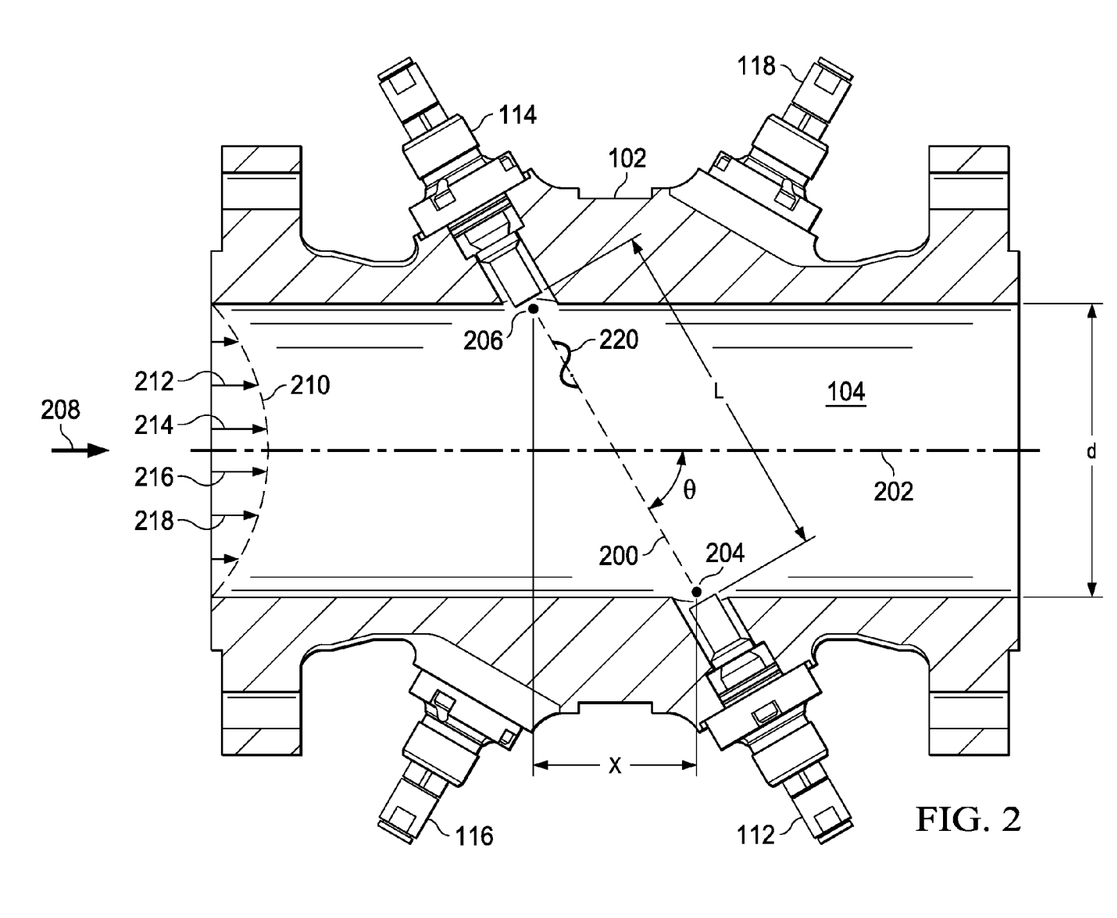
FIG. 2 shows a cross-sectional overhead view of an ultrasonic flow meter in accordance with various embodiments.

FIG. 2 shows a cross-sectional overhead view of the ultrasonic flow meter 101. Spool piece 102 has a predetermined size and defines the central bore 104 through which the measured fluid flows. An illustrative pair of transducers assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics 124 associated with the flow meter 101.

A path 200, also referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length d corresponding to the pipe inside diameter. In most cases, distances d, X, and L are precisely determined during flow meter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Sometime later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 101 carrying the fluid, the average velocity over the area of the central bore 104 may be used to find the volume of fluid flowing through the spool piece 102.

Ultrasonic flow meters can have one or more chords. For example, the flow meter 101 includes four chordal paths at varying elevations within the spool piece 102. The flow velocity of the fluid may be determined at each chord to obtain chordal flow velocities, and the chordal flow velocities combined to determine an average flow velocity over the entire pipe. From the average flow velocity, the amount of fluid flowing in the spool piece, and thus the pipeline, may be determined.

Typically, the control electronics 124 causes the transducers (e.g., 112, 114) to fire and receives output signals from the transducers. The control electronics 124 may also compute the mean flow velocity for each chord, compute the mean flow velocity for the meter, compute the volumetric flow rate through the meter, compute speed of sound through the fluid, perform meter diagnostics, etc. The volumetric flow rate and other measured and computed values, such as flow velocity, speed of sound, etc. may be output to the condition monitor 128. As noted above, the condition monitor 128 may be included in the control electronics 124 in some embodiments.

For a given chord, the chordal flow velocity v is given by:

$$v = \frac{L^2}{2X} \cdot \frac{T_{up} - T_{dn}}{T_{up}T_{dn}}, \qquad (2)$$

and the chordal speed of sound c is given by:

$$c = \frac{L}{2} \cdot \frac{T_{up} + T_{dn}}{T_{up}T_{dn}} \qquad (3)$$

where:
L is the path length (i.e., face-to-face separation between upstream and downstream transducers),
X is the component of L within the meter bore in the direction of the flow, and
$T_{up}$ and $T_{dn}$ are the upstream and downstream transit times of sound energy through the fluid.

The average flow velocity through the meter 101 is given by:

$$v_{avg} = \sum_i w_i v_i \qquad (4)$$

where:
$w_i$ is a chordal weighting factor,
$v_i$ is the measured chordal flow velocity, and
the summation i is over all chords.

Returning now to FIG. 1, the sensors 134-138 measure various attributes or parameters of the fluid, and may provide the measurements to the condition monitor 128 via signal conduction media 142 (e.g., wiring). The sensor 134 is a gas composition sensor, such as a gas chromatograph, that provides information indicative of the amount of each constituent of the gas flowing through the system 100. The sensor 136 is a pressure sensor that provides signals indicative of the pressure of the fluid flowing in the system 100. The sensor 138 is a temperature sensor (e.g., a resistance temperature detector) that provides signals indicative of the temperature of the fluid flowing through the system 100. The temperature sensor 138 extends into the interior passage 140 of the pipe 132, and measures the temperature of the fluid flowing through the system 100 at the terminus of sensor 138. Thus, the temperature sensor 138 is positioned to measure the temperature of the fluid at a specific elevation.

From the fluid composition, pressure, and temperature information provided by sensors 134, 136, and 138 respectively, the speed of sound through the fluid stream can be computed using predetermined theoretical or experimental values. For example, the condition monitor 128 may compute speed of sound in the fluid as specified in American Gas Association Report No. 10, "Speed of Sound in Natural Gas and Other Related Hydrocarbons" (AGA 10). Some embodiments of the condition monitor 128 may use this computed speed of sound to verify the speed of sound values measured for each chord of the meter 101.

Similarly, based on the speed of sound measurements provided by the ultrasonic flow meter 101 and the measurements provided by the sensors 134, 136, the condition monitor 128 can compute the temperature, pressure, and/or composition of the fluid flowing through the ultrasonic metering system 100. The condition monitor 128 may compute temperature, pressure, and/or composition using an iterative reverse of the speed of sound computation specified by AGA 10 based on the measured speed of sound provided by the ultrasonic meter 101 and measurements provided by the sensors 134-136.

Figure 3:
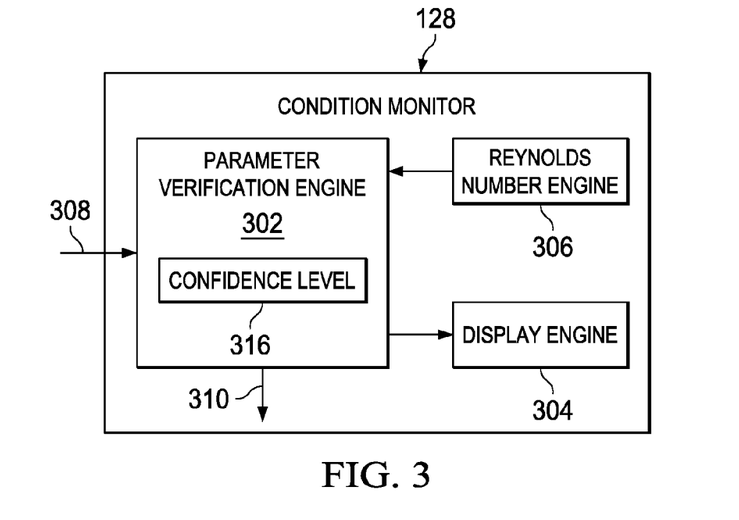
FIG. 3 shows a block diagram of a condition monitoring system in accordance with various embodiments.

FIG. 3 shows a block diagram of the condition monitor 128 in accordance with various embodiments. The condition monitor 128 includes a parameter verification engine 302 and a display engine 304. The parameter verification engine 302 acquires values of various operational parameters 308 from the ultrasonic meter 101, the sensors 134-138, etc. and processes the parameter values to identify changes in operation of the metering system 100 that may be indicative of potential flow measurement inaccuracy or other deviations from expected operation. Embodiments of the parameter verification engine 302 may acquire and process values of parameters 308, where the parameters 308 include gains applied to ultrasonic transducers for detection of ultrasonic signals, flow profile factor, flow symmetry, crossflow, flow swirl, chordal signal-to-noise ratios, etc.

Some embodiments of the condition monitor 128 also include a Reynolds number engine 306. The Reynolds number engine 306 computes Reynolds numbers for fluid flowing through the flow meter 101 at times corresponding to the acquisition of the values of the parameter 308. Embodiments may compute the Reynolds numbers based on measured parameters of the fluid flowing through the flow meter 101 provided by the flow meter 101 and transducers 134-138 as:

$$Re(ng) = \frac{\rho(ng)VD}{\mu(ng)} \qquad (5)$$

where:
Re(ng) is the Reynolds number of the natural gas;
ρ(ng) is the stream density of the natural gas;
V is the velocity of the natural gas;
D is the diameter of the central channel of the meter; and
μ(ng) is the dynamic viscosity of the natural gas.

The Reynolds number engine 306 can compute density of the fluid based on gas composition, pressure, and temperature measurements provided by the transducers 134-138. The velocity of the fluid is measured by the flow meter 101, and the diameter of the central passage 104 is determined at manufacture and available from a calibration certificate. The Reynolds number engine 306 may apply pressure compensation calculations to pressure compensate the diameter.

The parameter verification engine 302 may compute a reference value with respect to each parameter processed. Embodiments of the parameter verification engine 302 may compute the reference value based on a nominal or expected value of the parameter with respect to a reference parameter. The reference parameter may be, for example, velocity or Reynolds number of the fluid flowing through the ultrasonic meter 101 at the time the value of the parameter is acquired. The parameter verification engine 302 may also compute thresholds relative to the reference value. The thresholds may define a range within which values of the parameter being processed are considered to indicate that the flow metering system 100 is operating properly. Conversely, values of the parameter falling outside the range defined by the thresholds may indicate that the flow metering system 100 is not operating properly.

The parameter verification engine 302 includes confidence level determination logic 316. The confidence level determination logic 316 computes a confidence level value with respect to each parameter that has exceeded the value range defined by the thresholds (i.e., triggered an alarm) during a monitoring interval (i.e., a monitoring time period). A monitoring interval may be an hour, a day, or any other predetermined time period. Embodiments of the confidence level determination logic 316 measure the time within a monitoring interval during which each alarm is set. Such embodiments may define the confidence level with respect to an alarm as the percentage of time of the monitoring interval that the alarm is not set.

The confidence level determination logic 316 may also determine an overall confidence level of proper operation of the metering system 100 during the monitoring interval. The overall confidence level may be based on the confidence levels determined for each alarm during the monitoring interval. For example, the confidence level determination logic 316 may define the overall confidence level to be the minimum confidence level associated with an alarm during the monitoring interval. Based on the confidence level determinations provided by the confidence level determination logic 316, the condition monitor 128 may determine at what point further analysis is to be applied to an operating parameter. For example, a parameter exhibiting a confidence level less than a predetermined value (e.g., 95%) may be subject to further investigation to determine the underlying cause of the alarm.

The parameter verification engine 302 may also monitor the velocity and/or Reynolds number of fluid flowing through the meter 101 at the time a parameter value that triggers an alarm is acquired. The range of velocities and/or Reynolds numbers of the fluid corresponding to values that triggered an alarm during the monitoring interval is recorded for each alarm. Because alarm characteristics may be velocity dependent, additional analysis rules may be established based on the velocity range in which an alarm is set. For example, because alarm diagnostics may break down at low fluid velocity due to the influences of the pipe wall, etc., the condition monitor 128 may not indicate a need for or provide further analysis of an alarm unless the fluid velocity is above a predetermined value (e.g., three meters per second).

Patterns over a period of time with regard to velocity and/or Reynolds number may be identified and applied to diagnose alarm conditions. For example, if a given alarm is asserted only when the velocity exceeds 17 m/sec, the condition monitor 128 may indicate that the alarm threshold at these velocities may be incorrect.

During a monitoring interval, for each alarm, the parameter verification engine 302 may also identify each transition of the parameter corresponding to the alarm across the thresholds (i.e., alarm state transitions). When an alarm changes state multiple times within a monitoring interval, the changes may indicate that the parameter is operating on or about its alarm threshold, and that alarm delays before annunciation of alarm state changes may be beneficial.

The display engine 304 generates displays for presentation of information provided by the parameter verification engine 302 to a user. For example, the display engine 304 may generate a display of values of a selected operational parameter of the ultrasonic meter 101 that have triggered an alarm with corresponding confidence levels, velocities, Reynolds numbers, and other information disclosed herein. The display engine 304 may present the display via a monitor as is known in the art (e.g., a flat panel monitor), a printer, or other display device.

Figure 4:
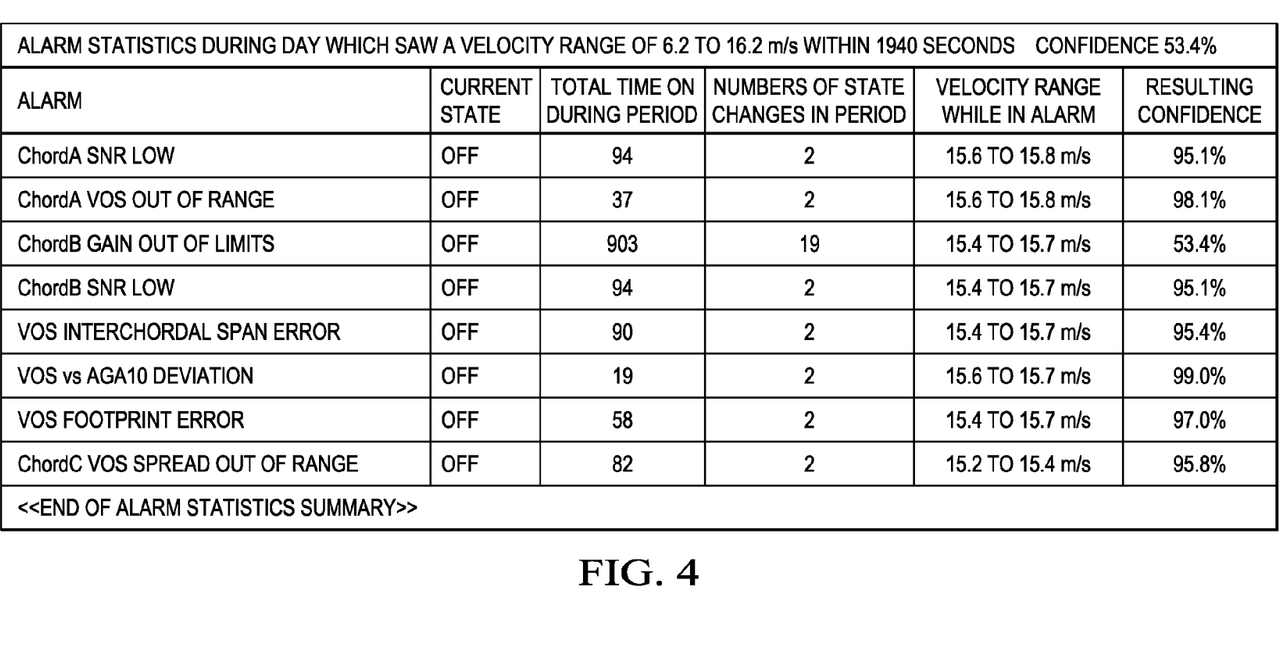
FIG. 4 shows illustrative alarm statistics in accordance with various embodiments.

FIG. 4 shows an illustrative display of alarm statistics generated by the condition monitor 128 in accordance with various embodiments. Each parameter triggering an alarm during the monitoring interval (1940 seconds in FIG. 4), is shown. In conjunction with each alarm, total alarm active time, number of state changes, velocity range, and confidence are displayed. Overall confidence and fluid velocity with respect to the monitoring period are also provided. Based on the information provided in the display, the condition monitor 128 and/or a user of the condition monitor 128 may determine which of the alarm generating parameters merit further analysis. For example, in FIG. 4, the gain of chord B is shown to be out of limits for a portion of the monitoring period that resulted in only 53.4% confidence that the system 100 is operating properly with regard to the parameter. All other illustrated alarms exhibit confidence level values in excess of 95%. Consequently, the condition monitor 128 and/or a user thereof may determine that further analysis should be applied to chord B gain to determine the cause of the alarm.

Embodiments of the parameter verification engine 302, the Reynolds number engine 306, and the display engine 304 may include hardware resources or hardware and software resources (i.e., instructions) to perform the functions disclosed herein. For example, some embodiments of the parameter verification engine 302, the Reynolds number engine 306, and the display engine 304 may be implemented as one or more processors executing instructions retrieved from a computer-readable storage medium. Processors suitable for implementing the engines 302, 304, 306 may include general-purpose microprocessors, digital signal processors, microcontrollers, or other devices capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. A non-transitory computer-readable storage medium suitable for storing instructions of the engines 302, 304, 306 may include volatile storage such as random access memory, non-volatile storage (e.g., a hard drive, an optical storage device (e.g., CD or DVD), FLASH storage, read-only-memory), or combinations thereof.

Some embodiments of the parameter verification engine 302, the Reynolds number engine 306, the display engine 304, and other engines or portions of the condition monitor 128 disclosed herein may be implemented as hardware circuitry configured to perform the functions disclosed herein. Selection of a hardware or processor/instruction implementation of embodiments is a design choice based on a variety of factors, such as cost, time to implement, and the ability to incorporate changed or additional functionality in the future.

Figure 5:
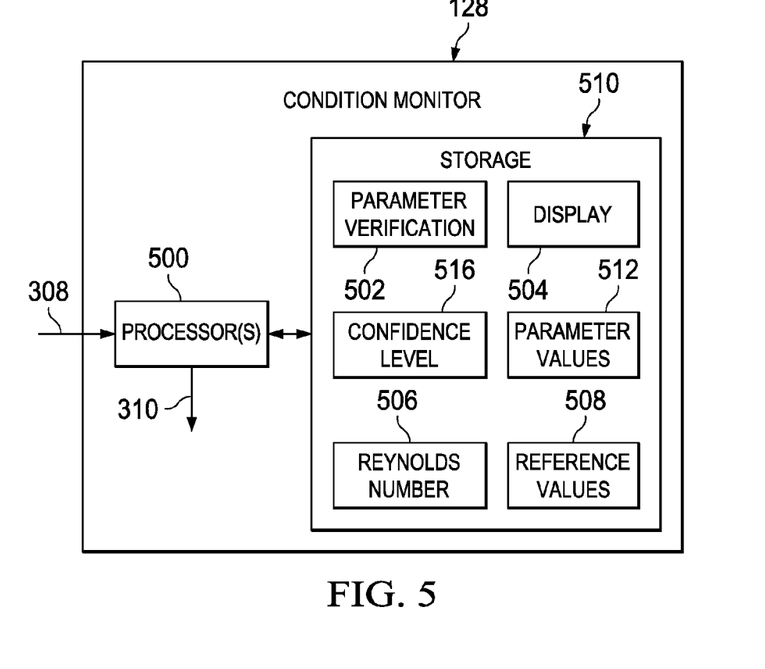
FIG. 5 shows a block diagram of a processor-based embodiment of a condition monitor in accordance with various embodiments.

FIG. 5 shows a block diagram of a processor-based embodiment of the condition monitor 128. The embodiment of the condition monitor 128 shown in FIG. 5 includes a processor 500 and storage 510 coupled to the processor 500. The processor 500 is an instruction execution device as described above. The storage 510 is a computer-readable medium as described above. The processor 500 retrieves and executes instructions stored in the storage 510, reads data from the storage 510, writes data to the storage 510, and communicates with other systems and devices. The storage 510 includes a parameter verification module 502, a Reynolds number module 506, a confidence level module 516, and a display module 504 which respectively include instructions for implementing the parameter verification engine 302, the Reynolds number engine 306, the confidence level determination logic 316, and the display engine 304. The storage 510 may also include processed and/or unprocessed parameter values 512 (e.g., transducer gain values, profile factor values, Reynolds number values, alarm information, confidence level values, etc.), reference values 508 that correspond to the parameters processed, threshold values, etc. The processor-based condition monitor 128 shown in FIG. 5 may include various other components, such as network adapters, video interfaces, peripheral interfaces, etc. that have been omitted from FIG. 5 in the interest of clarity.

Figure 6:
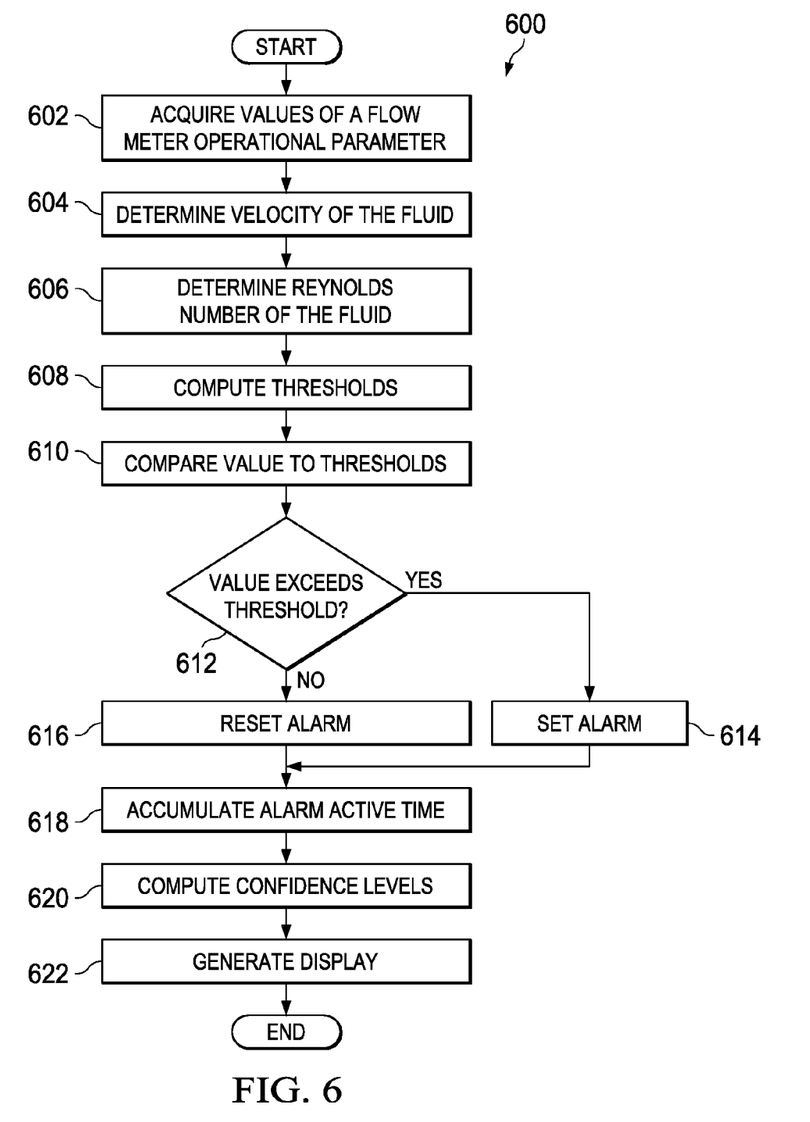
FIG. 6 shows a flow diagram for a method for monitoring the condition of an ultrasonic flow metering system in accordance with various embodiments.

FIG. 6 shows a flow diagram for a method 600 for monitoring the condition of an ultrasonic flow metering system 100 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be implemented as instructions stored in computer readable medium 510 and executed by the processor 500.

In block 602, fluid is flowing through the central passage 104 of the ultrasonic flow meter 101, and the flow metering system 100 is measuring the volume of fluid flowing through the passage 104. The condition monitor 128 is acquiring values of an operational parameter of the ultrasonic flow meter 101 and/or associated instrumentation. In practice, the condition monitor 128 may acquire a plurality of values for each of a plurality of operational parameters of the flow meter 101 and/or associated instrumentation. Parameters for which values are acquired may include gains applied to ultrasonic transducer output, flow profile factor, flow symmetry, cross-flow, flow swirl, chordal signal-to-noise ratios, flow turbulence, measured speed of sound, measured temperature, measured gas composition, measured pressure, etc.

In block 604, the condition monitor 128 determines the velocity of the fluid flowing through the flow meter 101. The flow velocity may be computed by the flow meter 101 and provided to the condition monitor 128 or computed by the condition monitor 128 based on information, such as chordal transit times, provided by the flow meter 101.

In block 606, the condition monitor 128 computes the Reynolds number of the fluid flowing through the passage 104 at the time each parameter value is acquired. Embodiments may compute the Reynolds number, based on information provided by the flow meter 101 and associated transducers 134-138 as disclosed herein with regard to equation (5).

In block 608, the condition monitor 128 computes thresholds. The thresholds indicate a range of acceptable values of the parameter at a respective Reynolds number, velocity, or other reference parameter. The thresholds may be determined based on a predetermined value deemed nominal (as expected) at the Reynolds number, velocity or other reference parameter corresponding to each value of the parameter.

In block 610, the condition monitor 128 compares the parameter values to the corresponding thresholds. If a value of the parameter exceeds the corresponding thresholds (i.e., is outside the range established by the thresholds) in block 612, then in block 614, the condition monitor 128 sets the alarm corresponding to the parameter. If the value of the parameter does not exceeds the corresponding thresholds (i.e., is within the range established by the thresholds) in block 612, then in block 616, the condition monitor 128 resets the alarm corresponding to the parameter.

In block 618, the condition monitor 128 accumulates time that the alarm corresponding to the parameter is set during a monitoring interval. The condition monitor 128 also records the number of times that the alarm has transitioned between the set and reset states during the monitoring interval, and the velocity and/or Reynolds number corresponding to each parameter value that caused the alarm to be set during the monitoring interval.

In block 620, the condition monitor 128 computes the confidence level that the metering system 100 is operating properly with regard to each parameter that has caused an alarm to be set with the monitoring interval. In some embodiments, the confidence level with regard to an alarm may be equivalent to the percentage of the monitoring interval during which the alarm was not set. The condition monitor 128 also computes an overall confidence level that the metering system 100 is operating properly based on all the alarms set during the monitoring interval. The overall confidence level may be equivalent to the lowest confidence level associated with an alarm set during the monitoring interval.

In block 622, the condition monitor 128 generates a display showing alarm information for the monitoring interval. Information displayed may include each alarm set, total time each alarm was set, number of state transitions for each alarm, velocity/Reynolds number range, and confidence level. The display may also include range of velocities and/or Reynolds numbers of the fluid flowing through the flow meter 101 during the monitoring interval, and the overall confidence level of proper operation.

The above discussion is meant to be illustrative of the principles and various exemplary embodiments of the present invention. Numerous variations and modifications will become apparent to those skilled in the art once the above disclosure is fully appreciated. For example, while embodiments of the invention have been described with regard to an ultrasonic flow meter, those skilled in the art understand that embodiments are equally applicable to other types of flow meters. It is intended that the following claims be interpreted to embrace all such variations and modifications.

What is claimed is:

1. A flow metering system, comprising:
    a flow meter configured to measure volume of fluid flowing through the flow meter; and
    a condition monitor coupled to the flow meter and configured to:
    monitor a parameter of operation of the flow meter;
    compare a value of the parameter to a threshold;
    generate an alarm based on the value exceeding the threshold; and
    compute, based on the alarm, a confidence level indicating a degree of certainty that the system is operating in accordance with predetermined criteria.

2. The system of claim 1, wherein the condition monitor is configured to compute the confidence level based on a ratio of time the alarm is active to duration of an alarm reporting interval.

3. The system of claim 1, wherein the parameter comprises one of ultrasonic transducer gain, chordal signal to noise ratio, chordal velocity, and spread of chordal velocities.

4. The system of claim 1, wherein the condition monitor is configured to determine at least one of:
    an amount of time that the alarm is active within an alarm reporting interval; and
    a number of alarm state changes occurring within an alarm reporting interval.

5. The system of claim 1, wherein the condition monitor is configured to determine a range of fluid flow velocities corresponding to intervals during which the alarm is active.

6. The system of claim 1, wherein the condition monitor is configured to:
    generate a plurality of alarms, each of the alarms corresponding to a different parameter of operation of the flow meter exceeding a threshold;
    compute, for each of the alarms, a confidence level indicating a degree of certainty that the system is operating in accordance with predetermined criteria with regard to the alarm; and
    compute an overall confidence level indicating a degree of certainty that the system is operating in accordance with predetermined criteria based on the confidence levels computed for the plurality of alarms.

7. The system of claim 6, wherein the condition monitor is configured to generate a display showing:
    the plurality of alarms,
    the confidence level corresponding to each of the alarms;
    the overall confidence level; and optionally
    one or more of:
        time duration during which each alarm was active;
        velocity range of fluid flow while each alarm was active;
        Reynolds number range of fluid while each alarm was active; and
        number of state changes for each alarm.

8. A method for monitoring operation of a flow meter, comprising:
    acquiring, by a monitoring system, a value of a parameter of operation of the flow meter during operation of the flow meter;
    comparing, by the monitoring system, the value of the parameter to a threshold;
    generating, by the monitoring system, an alarm based on the value exceeding the threshold; and
    computing, by the monitoring system, based on the alarm, a confidence level indicating a degree of certainty that the flow meter is operating in accordance with predetermined criteria.

9. The method of claim 8, further comprising selecting the parameter from a group consisting of ultrasonic transducer gain, chordal signal to noise ratio, chordal velocity, and spread of chordal velocities.

10. The method of claim 8, further comprising computing the confidence level as a function of duration during which the alarm is active and duration of an alarm reporting interval.

11. The method of claim 8, further comprising determining, by the monitoring system:
    an amount of time that the alarm is active within an alarm reporting interval;
    a number of alarm state changes occurring within the alarm reporting interval; and
    one of a range of fluid flow velocities and a range of Reynolds number values corresponding to intervals during which the alarm is active.

12. The method of claim 8, further comprising:
    generating, by the monitoring system, a plurality of alarms, each of the alarms corresponding to a different parameter of operation of the flow meter exceeding a threshold;
    computing, by the monitoring system, for each of the alarms, a confidence level indicating a degree of certainty that the flow meter is operating in accordance with predetermined criteria; and
    computing, by the monitoring system, an overall confidence level indicating a degree of certainty that the flow meter is operating in accordance with predetermined criteria based on the confidence levels computed for the plurality of alarms.

13. The method of claim 12, further comprising generating, by the monitoring system, a display showing:
    the plurality of alarms,
    the confidence level corresponding to each of the alarms;
    the overall confidence level; and optionally
    one or more of:
        time duration during which each alarm was active;
        velocity range of fluid flow during the time duration;
        Reynolds number range of fluid during the time duration; and
        number of state changes for each alarm.

14. A condition monitoring system for monitoring operation of a flow meter, comprising:
    a parameter verification engine configured to:

acquire a value of a parameter of operation of the flow meter during operation of the flow meter;
compare the value of the parameter to a threshold;
generate an alarm based on the value exceeding the threshold; and
compute, based on the alarm, a confidence level indicating a degree of certainty that the flow meter is operating in accordance with predetermined criteria.

15. The system of claim 14, wherein the parameter comprises one of ultrasonic transducer gain, chordal signal to noise ratio, chordal velocity, and spread of chordal velocities.

16. The system of claim 14, wherein the parameter verification engine is configured to compute the confidence level as a function of duration of alarm being active and duration of alarm monitoring interval.

17. The system of claim 14, wherein the parameter verification engine configured to determine an amount of time that the alarm is active within an alarm reporting interval.

18. The system of claim 14, wherein the parameter verification engine configured to determine a number of alarm state changes occurring within an alarm reporting interval.

19. The system of claim 14, wherein the parameter verification engine configured to determine a range of fluid flow velocities corresponding to intervals during which the alarm is active.

20. The system of claim 14, wherein the parameter verification engine is configured to:
generate a plurality of alarms, each of the alarms corresponding to a value of a different parameter of operation of the flow meter exceeding a threshold;
compute, for each of the alarms, a confidence level indicating a degree of certainty that the flow meter is operating in accordance with predetermined criteria; and
compute an overall confidence level indicating a degree of certainty that the flow meter is operating in accordance with predetermined criteria based on the confidence levels computed for the plurality of alarms.

21. The system of claim 20, further comprising a display engine configured to generate a display showing:
the plurality of alarms,
the confidence level corresponding to each of the alarms;
the overall confidence level; and optionally
one or more of:
time duration during which each alarm was active;
velocity range of fluid flow during the time duration;
Reynolds number range of fluid during the time duration; and
number of state changes for each alarm.

* * * * *